United States Patent [19]

Ornstein

[11] 4,182,357

[45] Jan. 8, 1980

[54] METHOD OF CONTROLLING THE RELATIVE HUMIDITY IN A SOIL ENVIRONMENT AND APPARATUS FOR ACCOMPLISHING SAME

[76] Inventor: Leonard Ornstein, 5 Biltom Rd., White Plains, N.Y. 10607

[21] Appl. No.: 882,789

[22] Filed: Mar. 2, 1978

[51] Int. Cl.² ............................................. F16K 7/06
[52] U.S. Cl. ........................................ 137/1; 147/78; 47/48.5; 239/63; 251/4; 251/5
[58] Field of Search .................... 47/1, 48.5; 251/4, 5, 251/7; 73/335, 336, 337; 137/455, 843, 1, 78, 525; 239/63

[56] References Cited

U.S. PATENT DOCUMENTS

| | | | |
|---|---|---|---|
| 3,204,872 | 9/1965 | Whear | 137/78 |
| 3,295,088 | 12/1966 | Smith | 73/335 X |
| 3,426,539 | 2/1969 | Whear | 405/37 |
| 3,518,831 | 7/1970 | Tibbals, Jr. et al. | 47/48.5 X |
| 3,596,744 | 5/1972 | Vonnegut | 73/335 |
| 3,833,013 | 9/1974 | Leonard | 251/5 X |
| 3,874,590 | 4/1975 | Gibson | 405/37 X |
| 3,898,843 | 8/1975 | Waterson | 47/1 X |
| 4,015,616 | 4/1977 | Hanff | 137/78 |
| 4,064,086 | 12/1977 | Cowsar et al. | 128/260 X |

FOREIGN PATENT DOCUMENTS

2325980 10/1974 Fed. Rep. of Germany ............. 137/78
2513600 10/1976 Fed. Rep. of Germany ............. 137/78

OTHER PUBLICATIONS

"Water Deficits and Plant Growth" Kozlowski, Dept. of Forrestry, Univ. of Wisconsin, Academic Press, vol. IV, 1976, p. 37.
"Soil-Water Potential: Direct Measurement by a New Technique," Peck, Science, vol. 151, Mar. 18, 1966, pp. 1385-1386.
"Viscoelastic Properties of Polymers" Ferry, Univ. of Wisconsin, 2nd Ed. Wiley & Sons, Chapter 17, pp. 519-573, 1970.

Primary Examiner—E. H. Eickholt
Attorney, Agent, or Firm—Morgan, Finnegan, Pine, Foley & Lee

[57] ABSTRACT

Method and apparatus are disclosed for controlling the relative humidity of a soil environment at a pre-set value using an enclosed volume of a water-soluble or water-swellable material, said enclosed volume separated from the external environment by a relatively stiff and strong semipermeable membrane and separated from a pressurized irrigation water supply by a water-impermeable constrictable flexible section or diaphragm in the supply line. When the soil is more moist than the pre-set value, intake of water through the membrane causes expansion of the water-swellable material which in turn constricts the flexible section of the water supply line to interrupt the flow of water to the soil. When the soil moisture falls below the pre-set value, egress of water from the water-swellable material releases the constricting force on the flexible section thereby allowing increased flow of water through the flexible section of supply line to the soil.

This process, which is called hygrostatic irrigation, is especially useful for optimized and unattended control and delivery of water to the root system of a plant growing in soil, particularly a potted plant, as well as for water conservation in the agricultural irrigation of arid regions. It also permits the optimized delivery to a plant, on a continuous basis in proportion to the water consumed, of nutrients, e.g. fertilizers dissolved at appropriate low concentrations in the supply water.

13 Claims, 5 Drawing Figures

METHOD OF CONTROLLING THE RELATIVE HUMIDITY IN A SOIL ENVIRONMENT AND APPARATUS FOR ACCOMPLISHING SAME

BACKGROUND OF THE INVENTION

The present invention relates generally to means for controlling and regulating the delivery of water to a soil environment containing growing plants, as a function of the humidity or moisture in the soil. More particularly, the invention relates to a method and self-contained apparatus for controlling the relative humidity of a soil environment at a pre-set value.

It is common horticultural practice to grow ornamental plants as well as seedlings and cuttings of forest and agricultural species in containers of natural or artificial soil, either outdoors, in greenhouses or hot-beds or indoors. Such potted plants require varying amounts of watering depending on numerous factors such as type of plant, rate of growth, relative humidity and rate of air flow around the leaves, and drainage through the container soil.

Where water supplies are plentiful, sprinkling or hosing from above the plants on some regular basis with sufficient excess to permit runoff usually provides a convenient means for meeting the needs of a group of plants outdoors or in a greenhouse or hot-bed. However, increasing concern for conserving water resources makes this a less than ideal practice.

Indoors, however, where runoff of excess water poses housekeeping problems, it is necessary to carefully water potted plants individually and manually. The chore is onerous and can easily lead to over- or under-watering to the detriment of the particular plant.

In field planting, especially in arid regions where the soil is often highly and variably porous, the terrain uneven, the temperature high and air humidity low, water losses due to evaporation and gravitational seepage from soil volumes well removed from the root systems can far exceed water lost by transpiration from crop foliage and be highly variable from plant to plant. Hence, valuable water supplies which might otherwise cost-effectively support agriculture, often fail with classical irrigation techniques or even with the most advanced trickle irrigation technology.

SUMMARY OF THE INVENTION

It is an object of this invention to provide a means for automatically delivering to each of one or a multiplicity of plants, on an essentially continuous basis, just that amount of water that it requires.

Another object is to provide a low cost, compact, self-contained, watering apparatus with long-term reliability, well suited to both the watering of house plants and to agricultural irrigation.

A typical high-quality soil is porous, somewhat absorbent, and has good drainage. Except for the period immediately following a heavy rain or watering, the roots of a typical plant are not immersed in liquid water, but are exposed to humid air which surrounds them and the soil particles. The water partitions between the gas phase and the moist soil. The humidity in the gas phase of a soil is controlled by the so-called matric potential of its water. This is usually expressed as equivalent osmotic potential or pressure in bars. The potential of pure water is taken as zero, and the less available the water, the more negative the matric potential.

The following computations are provided in order to define osmotic potential in relationship to soil moisture:

Let $\pi$ equal the osmotic potential of an ideal (but not necessarily dilute) solution of a non-volatile solute, s, in water; T, the absolute temperature in °K.; $\overline{V}_w$, the partial molal volume of pure water (i.e., the volume of one gram molecular weight of water under standard conditions, which is 18.02 ml.; and $1/\overline{V}_w = 55.5$ moles of water per liter), R, the gas constant ($8.314 \times 10^{-2}$ liter-bars/mole-°K.); and $X_w$ is the mole fraction of water in an ideal solution.

$$\pi = \left( -\frac{RT}{\overline{V}_w} \ln X_w \right)$$

At 27° C.=300° K., $\pi = -1,384 \ln X_w$ bars (1 bar=0.987 atmospheres). Let the molal concentration of water be $c_w$, and of solute be $c_s$.

$$X_w = \frac{c_w}{c_s + c_w}, \text{ therefore}$$

$$\pi = 1,384 \ln \left( \frac{c_s + c_w}{c_w} \right) \text{bars.}$$

$[-\ln X_w = -\ln(1 - X_s) = X_s + \tfrac{1}{2} X_s^2 + \tfrac{1}{3} X_s^3$ $+ \ldots\ldots$ For $X_s << 1$ (i.e., $c_w >> c_s$), $-\ln X_w = X_s =$ $\dfrac{c_s}{c_s + c_w} \approx c_s/c_w = c_s/55.5$, therefore $\pi \approx 25\, c_s$ bars, which is the classic van't Hoff's Law for dilute solutions.]

The relative humidity, RH, of air in equilibrium with such an ideal solution is also $X_w$ (Raoult's Law). Therefore $$RH = e^{-\pi/1,384}.$$

The osmotic potential of an aqueous solution of water soluble long-chain polymers departs from ideality at high concentrations. The pressure rises above that computed for ideal behavior for two reasons: Increased hydrogen bonding of an increasing fraction of water by the polymer reduces $c_w$. In addition, as the polymer chain ends get entangled with one another, the momentum transfers on collision are mainly those of short segments of unhindered polymer chain, producing the effect of a higher concentration of lower molecular weight molecules.

Therefore the required concentration of a polymer to produce a given osmotic potential will be somewhat lower than that computed, assuming ideality.

Since a cross-linked aqueous gel is essentially a single molecule, its molal concentration is infinitesmal, and conversely, the mole fraction of water, $X_w$, in the gel is unity, independent of its weight concentration. If the behavior were ideal, the osmotic pressure of a gel would therefore be zero.

In fact, the behavior of cross-linked gels is such that they only exhibit negligible osmotic pressure at high levels of cross-linking. The fewer and further between are the cross-links, the more closely their osmotic behavior approaches that of an equivalent solution of long-chain polymers. That is, they behave as if the solution consisted of an appreciable molal concentration of short-chain segments, yielding finite and quite appreciable osmotic potentials. (As such gels swell in contact with water, however, tension develops along the chains, and the number of unhindered and unconstrained segments diminishes, reducing the osmotic potential much faster than can be accounted for by the increasing volume of the gel.)

Capillary forces, surface adsorption forces, the chemical binding forces of hygroscopic substances (e.g., hydrogen bonding), and the osmotic potential associated with dissolved solutes, all reduce the tendency for soil water to evaporate into the gas phase of the soil. Because of these forces, even at equilibrium, in wet but well-drained soil at its so-called "field capacity," the relative humidity is slightly less than 100%, typically about −0.3 bars matric potential.

As the soil dries out, the more weakly bound water in the largest capillary spaces is the first to be used up, followed by that in small capillary spaces, etc., and the humidity drops and the matric potential becomes more negative. When the relative humidity of the soil gas-phase drops to the so-called "permanent wilting potential," plants may die for lack of soil water. The permanent wilting potential typically falls between −10 and −15 bars, equivalent to about 99% relative humidity, varying only slightly with soil type, and hardly at all with plant type.

For minimal stress and maximal plant growth, the soil water matric potential should be kept below −0.3 bars, that is, the soil should not be water-logged, and above about −6 bars.

Different soils, e.g., clays, loams, sandy loams, and fine sand, will hold different amounts of water per unit volume at the same matric potential. But it is the matric potential which determines the availability of the water to the root system, and with a steady optimal matric potential, soils with very low water capacity can function as effectively as higher quality soils. Therefore, a device which is constructed to sense the relative humidity (matric potential) of the soil in the root zone, and through negative feedback, to control the flow of water to maintain a relatively constant matric potential will work equally well for virtually all kinds of plants in all kinds of soils.

Accordingly, this invention relates to a method and apparatus for controlling the relative humidity in a soil environment around the roots of a growing plant to regulate the moisture content in said environment which method comprises subjecting said environment to a self-contained, relative humidity sensor-regulator which is pre-set to control the delivery of water to the environment to maintain a desired level of humidity. The apparatus employed to effect the above-stated process, termed an osmotic relative humidity sensor-regulator valve, is also within the purview of this invention.

The relative humidity sensor-regulator contains as the sensing element, an enclosed volume of water containing a water-soluble or water-swellable material wherein the concentration of said material senses and sets the relative humidity of the environment to a pre-set value, said enclosed volume of water separated from the environment by a semipermeable membrane which is impermeable to said water-soluble or water-swellable material but permeable to water, wherein the amount and direction of flow of water which passes through said membrane as a result of osmotic transfer is dependent on the relative humidity of the ambient environment and controls flow of water from an otherwise isolated water supply to the environment by varying the pressure on a flexible section or flow-control diaphragm in a water supply line.

Fundamentally, the herein disclosed method controls the relative humidity of an environment to a pre-set value using an enclosed prescribed volume of a water-soluble or swellable material at a predetermined water concentration, said enclosed volume separated from the external environment by a semirigid, semipermeable membrane which is impermeable to the contained material but highly permeable to water. The enclosed volume of liquid or hydrogel communicates, hydraulically or by a hydraulically driven mechanical member, to a water impermeable flexible section through which, or flow-control diaphragm by which, water flows from a pressurized water supply to the environment to be controlled. When for example, as a result of irrigation, the humidity of that environment rises above the pre-set level, water is transported osmotically across the membrane into the enclosed volume, increasing the internal pressure thereby constricting the flexible section or diaphragm and reducing the flow of water from the irrigation supply. Conversely, when the environmental humidity drops below the preset value, water is transported osmotically in the opposite direction, the internal pressure drops, the constriction opens and water flow increases to the environment.

If the device responds reasonably rapidly, and the delivery rate is not excessive (i.e., there is sufficient hydraulic resistance in the system), the flow will be continuous and smooth, rather than oscillatory. The speed of response of the device is proportional to the ratio of the outer surface area of the membrane to the change in volume required to pinch off the water flow. It is also proportional to the water permeability of the semipermeable membrane and of the hydrogel.

Semipermeable membranes prepared for ultrafiltration and desalination of sea water by reverse osmosis, have properties very close to those required for this process. They pass fluxes of water of the order of 1 microliter per $cm^2$ per second for pressure differences of 1 atmosphere, and can withstand a few atmospheres without rupturing.

A disadvantage of a design which uses a semipermeable membrane with a filling of a solution of a relatively high molecular weight solute is that the membrane and chamber seals must be absolutely leak-proof if such a device is to operate reliably over a period of a year or more.

Preferably, the "filling solution" comprises an appropriately compounded, slightly cross-linked gel, and the leak problem disappears. In fact, a rather large pore (e.g., 0.2 mm) semirigid mesh can serve as the "semipermeable membrane." The mesh will of course pass water freely, but the swelling of the gel will not result in significant bulging through the mesh pores, and as osmotic flow occurs into the device, the gel swells inwardly leading to the constriction of the flexible section of the waterline.

In a preferred embodiment, said osmotically-sensitive means comprises a chamber surrounding a water-impermeable flexible tube; water-swellable material occupying the chamber surrounding the flexible tube; and a semirigid water-permeable membrane, impermeable to the water-swellable material, forming part of the outer wall of the chamber.

In another preferred embodiment, said osmotically-sensitive means comprises a chamber a portion of one wall of which is a water-impermeable flexible tube; a semirigid water-permeable membrane which is impermeable to a water-swellable material which membrane forms a second side of the chamber, a piston in the chamber in contact with the flexible tube; water-swellable material occupying a part of the chamber between said membrane and said piston and rigid means located adjacent the flexible tube on the side opposite the piston.

In another preferred embodiment, said osmotically-sensitive means comprises a chamber one side of which is a semirigid water-impermeable diaphragm, a water-permeable membrane which is impermeable to a water-swellable material which membrane forms a second side of the chamber, a piston in the chamber in contact with the diaphragm, water-swellable material occupying a part of the chamber between said membrane and said piston, and rigid means located adjacent the diaphragm on the side opposite the piston.

The osmotic sensor-regulator valve of this invention embodies a self-contained, closed container filled with a volume of an aqueous solution of a solute or swellable gel which serves as the humidity sensor. At least part of the wall of the container is composed of a semirigid, semipermeable membrane. It can be readily buried in the soil among the plant roots. The membrane is highly permeable to water but impermeable to the solute (or water-swellable material). The solute concentration typically is set so that the chemical potential of water contained in the membrane-enclosed-volume is near that of air at 99% relative humidity. If the solute has a molecular weight of about 5,000 and is present at about 30% concentration by volume, the water concentration will be about 70%, and assuming ideal behavior, the osmotic potential will be about 2.1 bars. From Raoult's Law, the relative humidity of air in equilibrium with the device will be about 99.8%. If the humidity in the soil increases above 99.8%, water will pass osmotically inwardly through the membrane, and if the membrane is relatively rigid and therefore the increase in enclosed volume due to the osmotic swelling is small, the hydrostatic pressure within the valve will rise to almost 2.1 bars, at which point, the net flow across the membrane will cease.

The rise in pressure in the enclosure constricts the flow of water through the compressible means delivering water to the soil and provides the required negative feedback for the device. As the plant consumes water, the relative humidity around the roots will gradually drop below 99.8%. Water will then pass back from the enclosed volume through the membrane into the environmental soil, the pressure within the valve will drop, relieve the constriction, and water flow to the soil increases.

Thin-walled silicone rubber tubing or diaphragm is well suited as the material for the compressible wall of a waterline within the sensor.

DESCRIPTION OF THE DRAWINGS

The invention will be described with reference to the accompanying drawings which will give a clearer understanding of the invention and preferred method of practicing the invention.

DESCRIPTION OF THE PREFERRED EMBODIMENTS

Figure 1:
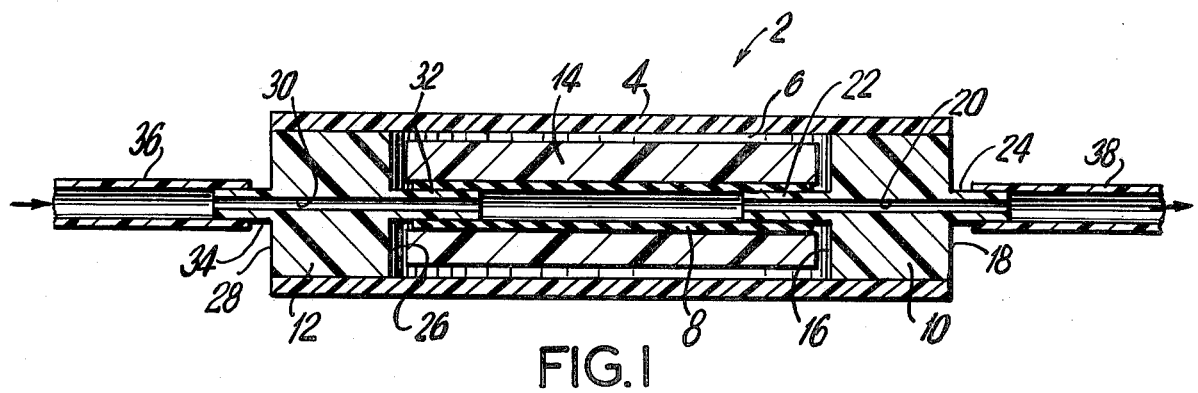
FIG. 1 is a longitudinal sectional view of the valve in a non-constricted embodiment.

Suitable construction for the valve is described in FIGS. 1, 2, 3, 4 and 5. Referring now to FIG. 1, which is illustrative of the apparatus of this invention, the valve 2 contains a body section generally cylindrical with its axis horizontal in this section with osmotically-sensitive means comprising a water-permeable membrane 4, a chamber 6, a flexible tube 8 arranged to pass through the chamber 6, end pieces 10 and 12 and water-swellable material 14 which occupies the chamber 6. The end piece 10 is formed with an inner wall 16 and an outer wall 18 and is provided with a passage 20. The passage 20 extends beyond both walls 16 and 18 in the form of nipples 22 and 24 respectively. The end piece 12 is formed with inner wall 26 and outer wall 28 and is provided with a passage 30. The passage 30 extends beyond the inner wall 26 and the outer wall 28 in the form of nipples 32 and 34 respectively. In the preferred embodiment the membrane 4 and end pieces 10 and 12 form the body of the valve 2. The inner walls 16 and 26 of the end pieces 10 and 22 define the chamber 6 which water from the ambient environment enters into or leaves via membrane 4.

The flexible tube 8 or diaphragm is preferably comprised of silicone rubber, although any compressible material which is inert in an aqueous environment such as polyurethane, PVC or rubber is applicable.

The body section is typically constructed of polypropylene, however, other materials such as polymeric acetals, nylon and polyester, materials which are stable to moisture and possess reasonable strength are employable.

The water-soluble or water-swellable material 14 is typically a hydrogel such as a solid gel derived from polyacrylamide, polyvinyl alcohol formulations, etc. Preferred is a hydrogel capable of swelling compliantly to about 25 times its dry volume when IN equilibrium with water at 100% humidity.

The semipermeable membrane 4, usually in mesh form, when used with such a hydrogel, is composed generally of the same material as the body section. In some instances a stainless steel mesh is applicable.

The nipples 22 and 32 connect to the ends of the flexible tube 8 and the nipples 34 and 24 attach respectively to the supply line 36 and the line 38 to the soil environment.

Figure 2:
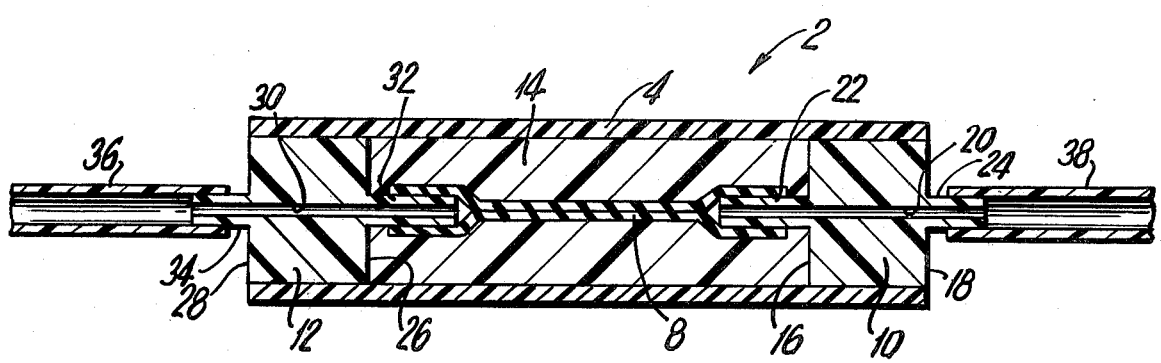
FIG. 2 is a longitudinal view of the valve seen in FIG. 1 in the constricted configuration.

FIG. 2 illustrates the valve of FIG. 1 in the constricted or closed configuration. As seen, the swellable material 14 in chamber 6 is expanded in volume and exerts sufficient pressure on the flexible tube 8 to contrict or completely collapse the water passage defined by the flexible tube in the region between nipples 22 and 32 thereby preventing the flow of water between inlet 36 and outlet 38.

Figure 3:
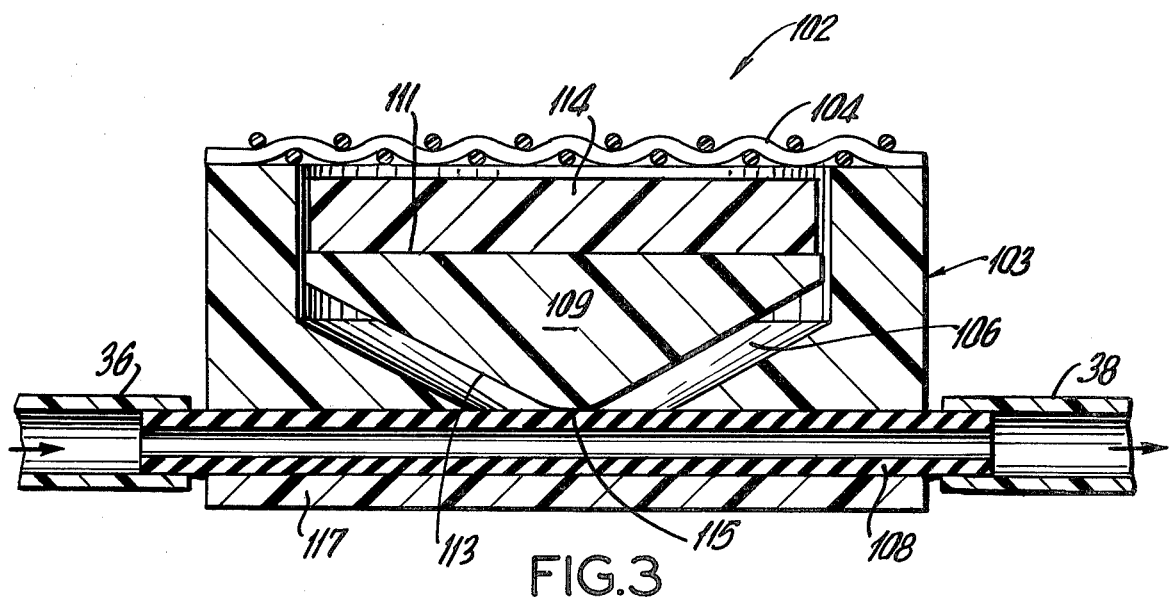
FIG. 3 is a longitudinal sectional view of still another preferred embodiment of the valve disclosed and claimed herein.

Referring now to FIG. 3 which is illustrative of another preferred embodiment of this invention, valve 102 comprises a body section 103, generally cylindrical with its axis vertical in this section, having osmotically-sensitive means comprising a water-permeable membrane 104, a chamber 106, water-swellable material 114, partially occupying chamber 106, piston 109 within chamber 106 having a flat upper surface 111 and a conical lower surface 113 tapering to a blunt point 115 and free to move axially so as to restrain passage of water through flexible tube 108 by downward movement actuated by expansion of swellable material 114 in chamber 106. The flexible tube 108 is supported by the body section 103 and passes through the lower portion of chamber 106. The bottom surface of the flexible tube 108 is supported by relatively rigid means such as plate 117, the lower wall of body section 103, located adjacent the flexible tube 108 on the side opposite piston 109.

In operation, the swellable material 114 in chamber 106 is expanded in volume and exerts sufficient pressure on the upper surface of the piston 109 causing the bottom conical portion of piston 109 at point 115 to compress or collapse flexible tube 108 at the point of contact thereby preventing the flow of water between inlet 36 and outlet 38.

Conversely, upward movement of the piston 109 follows the shrinkage in the water-swellable material 114 in the chamber 106 removing the constriction in the flexible tube 108 at point 115 thereby allowing the passage of water through the tube 108 between inlet 36 and outlet 38.

Figure 4:
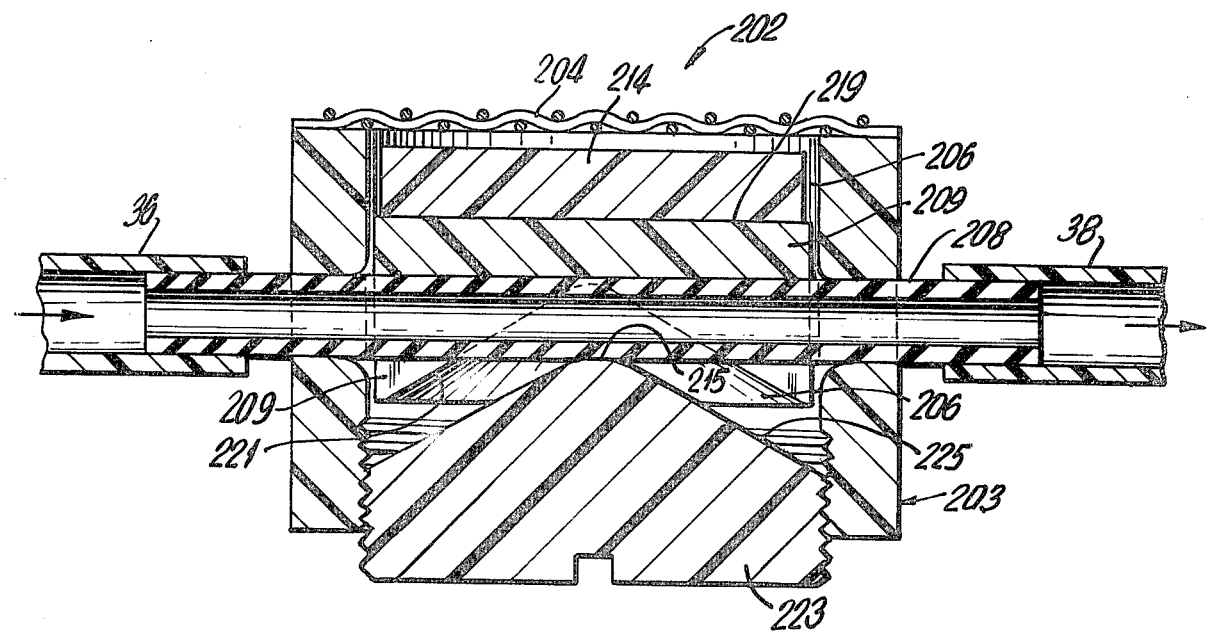
FIGS. 4 and 5 are longitudinal sectional views of still other preferred embodiments of the valve disclosed and claimed herein.

Referring now to FIG. 4 which is illustrative of another preferred embodiment of this invention, valve 202 comprises a generally cylindrical body section 203 having osmotically-sensitive means comprising a water-permeable membrane 204, a chamber 206, water-swellable material 214 partially occupying chamber 206, piston 209 within the chamber 206 having flat upper and conical lower surfaces 219 and 221 respectively free to move axially so as to restrain passage of water through the flexible tube 208 by downward movement actuated by expansion of material 214 in chamber 206. The flexible tube 208, supported by the body section and a seat in piston 209, passes through the lower portion of chamber 206. The bottom surface of flexible tube 208 is supported by relatively rigid means 223 located adjacent the flexible tube 208 on the side opposite the piston 209. The relatively rigid means 223 is a threaded member which is screwed into the lower portion of body section 203 having a conical upper surface 225 tapering to a blunt point 215 at the bottom surface of the flexible tube 208.

The operation of valve 202 is similar to that described for the valve 102 of the embodiment of FIG. 4. The swellable material 214 in chamber 206 is expanded in volume and exerts sufficient pressure on the upper surface 219 of the piston 209 causing the bottom surface 221 of the piston 209 to collapse or compress the flexible tube 208 at the point of contact with the tapered end 215 of member 223 thereby preventing the flow of water between inlet 36 and outlet 38.

Conversely, the upward movement of the piston 209 caused by shrinkage in volume of the swellable material 214 in the chamber 206 removes the constriction in the flexible tube 208 at point 215 thereby allowing the passage of water through the tube 208 between inlet 36 and outlet 38.

The threads on members 203 and 223 permit the adjustment of the pre-set humidity over a wide range.

Because of the large ratio of the area of the tops of the pistons to the area of the conical tips in FIGS. 3 and 4, these versions have substantial gain in their feedback loops so that they become much less sensitive to water-supply pressure variations than the version in FIGS. 1 and 2.

In the embodiments in FIGS. 3 and 4, there are no internal connections to the water supply which should lead to fewer assembly failures.

Figure 5:
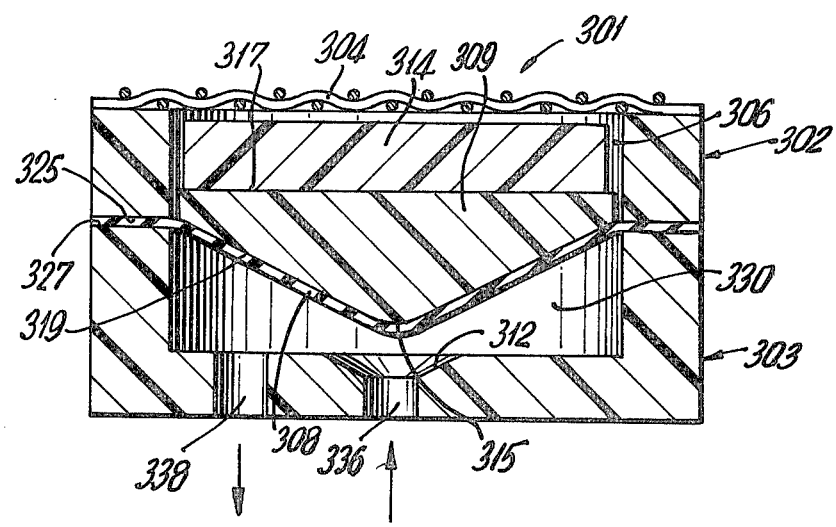

Referring now to FIG. 5, which is illustrative of another preferred embodiment of this invention, valve 301 comprises a generally cylindrical upper body section 302 and a lower body section 303 having osmotically-sensitive means comprising a water-permeable membrane 304, water-swellable material 314 partially occupying a chamber 306, a piston 309 within chamber 306 having a substantially flat upper surface 317 and a conical lower surface 319 tapering to a blunt point 315, a circular flexible diaphragm 308 conforming to the lower surface area of the piston 309 and sealed between the edges 325 and 327, respectively, of body sections 302 and 303. A bottom portion of the body section 303 has an inlet opening 336 for the passage of water, the upper surface of said inlet configured in a concavity 312 conforming to the shape of the conical lower surface of piston 309. An outlet 338 for the passage of water is adjacent inlet 336 and comprises an opening in rigid member 303.

In operation, the water-swellable material 314 in the chamber 306 is expanded in volume and exerts sufficient pressure on the upper surface 317 of the piston 309 to be displaced axially to cause the diaphragm 308 surrounding the bottom surface of the piston 309 to close the opening between tapered point 315 and the concavity 312 of the inlet opening 336 thereby preventing the flow of water between inlet 336 and outlet 338.

Conversely, the upward movement of the diaphragm 308 caused by shrinkage in volume of the water-swellable material 314 located in the chamber 306 allows for the passage of water through the inlet 336 into a cavity 330 and out through outlet 338.

This procedure, termed hygrostatic irrigation, is especially useful for unattended control and delivery of water to the root systems of individual potted or containerized plants as well as for water conservation in the agricultural irrigation of arid regions. It also permits the optimized delivery to a plant, on a continuous basis in proportion to the water consumed, of nutrients, e.g. fertilizers dissolved at appropriate concentrations in the supply water. This procedure is also applicable to the control of the humidity of environments other than soil.

This invention is also concerned with a device termed an osmotic relative humidity sensor-regulator valve which is devised to sense the relative humidity of the soil in the root zone, and through negative feedback, to control the flow of water to maintain a relatively constant matric potential for virtually all kinds of plants in all kinds of soils. This device can similarly control humidity in environments other than soil.

Accordingly, the apparatus disclosed herein for the purpose described above is an osmotic relative humidity sensor-regulator valve comprising: a body section; means for attaching the valve body section in a pressurized waterline; compressible means in the waterline for opening and closing the waterline; and osmotically-sensitive means for opening and closing the flexible means in the waterline.

It should be understood by those skilled in the art that various modifications may be made in the present invention without departing from the spirit and scope thereof as described in the specification and defined in the appended claims.

What is claimed is:

1. A method for regulating the flow of water to an environment in order to maintain the relative humidity in said environment at a preselected value which comprises sensing an increase or decrease in said environmental humidity relative to said preselected value by means of osmotic swelling or shrinking of a material capable of swelling no less than about 25 times its dry volume when in equilibrium with water at 100% relative humidity, wherein said swelling or shrinking obstructs or relieves, respectively, the flow of water to said environment thereby maintaining said relative humidity at the preselected value.

2. The method of claim 1 wherein said preselected value is prescribed by the concentration of said material which is water-soluble or a water-swellable slightly cross-linked hydrogel and by its volume at a particular environmental humidity relative to the volume of an enclosure which contains it.

3. The method of claim 2 wherein said enclosure is separated from the environment by a semipermeable membrane which is impermeable to said water-soluble material or water-swellable slightly cross-linked hydrogel but permeable to water and wherein the amount and direction of flow of water passing through said membrane due to osmotic transfer resulting in swelling or shrinking is dependent on the relative humidity of the ambient environment.

4. The method of claim 3 wherein said water-swellable slightly cross-linked hydrogel is capable of swelling to about 25 times its dry volume when in equlibrium with water at 100% relative humidity and wherein said semipermeable membrane has pores up to about 0.2 mm. in diameter.

5. The method of claim 3 wherein said swelling or shrinking of said enclosed volume of water-soluble material or water-swellable slightly cross-linked hydrogel results, respectively, in obstructing or relieving the flow of water, said water provided in a pressurized waterline which communicates hydraulically or mechanically with said enclosed volume through a compliant and water-impermeable conduit.

6. The method of claim 5 wherein said water-impermeable conduit is comprised of silicone rubber.

7. An osmotic relative humidity sensor-regulator valve comprising:
a chambered body section;
means for attaching the valve body section in a waterline;
compressible means in the waterline for opening and closing the waterline; and
osmotically-sensitive means contained in said chamber for opening and closing the compressible means in the waterline, and capable of swelling no less than about 25 times its dry volume when in equilibrium with water at 100% relative humidity.

8. The valve of claim 7 wherein the compressible means in the waterline for opening and closing the waterline is a section of a flexible tube with a water-impermeable wall and wherein said osmotically sensitive means comprises a chamber surrounding the flexible tube, a water-soluble or water-swellable material occupying the chamber, and a water-permeable membrane, forming at least part of the outer wall of the chamber, which is impermeable to said water-soluble or water-swellable material.

9. The valve of claim 7 wherein the compressible means in the waterline for opening and closing the waterline is a section of a flexible tube with a water-impermeable wall and wherein said osmotically sensitive means comprises a chamber a portion one wall of which is the flexible tube, a water-permeable fine mesh membrane which is impermeable to a water-swellable slightly cross-linked hydrogel, which membrane forms a second wall of the chamber, a piston in the chamber contactable with the flexible tube, water-swellable slightly cross-linked hydrogel occupying a shallow part of the chamber between said membrane and said piston and relatively rigid means located adjacent the flexible tube on the side opposite the piston forming an outer wall of the chamber, all moving parts enclosed.

10. The valve of claim 9 wherein said piston has a flat upper surface and a conical lower surface tapering to a blunt point free to move axially to press upon said flexible tube and said relatively rigid means located adjacent the flexible tube on the side opposite the piston configured to seat the compressed flexible tube and tapered conical point.

11. The valve of claim 9 wherein said piston has flat upper surface and lower surface configured to seat the compressed flexible tube and a tapered conical point free to move axially upon said flexible tube, and said relatively rigid means located adjacent the flexible tube on the side opposite the piston is a member having a conical upper surface tapering to a blunt point contacting the bottom surface of the flexible tube and threaded to provide an adjustable chamber volume.

12. The valve of claim 7 wherein the compressible means in the waterline for opening and closing the waterline is a flexible water-impermeable diaphragm and wherein said osmotically sensitive means comprises a chamber one side of which is the diaphragm, a water-permeable membrane which is impermeable to a water-soluble or water-swellable material which membrane forms a second side of the chamber, piston in the chamber in contact with the diaphragm, water-soluble or water-swellable material occupying a part of the chamber between said membrane and said piston, and relatively rigid means located adjacent the diaphragm on the side opposite the piston.

13. The valve of claim 12 wherein said piston has a flat upper surface and a conical lower surface tapering to a blunt point and said relatively rigid means located adjacent the diaphragm on the side opposite the piston has an upper surface configured to receive the diaphragm conforming to the shape of conical lower surface of said tapering conical piston forming a valve seat.

* * * * *